United States Patent
Roze et al.

(10) Patent No.: US 11,104,212 B2
(45) Date of Patent: Aug. 31, 2021

(54) BODYWORK PANEL COMPRISING ADDED STIFFENING ELEMENTS

(71) Applicant: COMPAGNIE PLASTIC OMNIUM, Lyons (FR)

(72) Inventors: Bertrand Roze, Sainte Julie (FR); Mylène Martinez-Robbe, Sainte Julie (FR)

(*) Notice: Subject to any disclaimer, the term of this patent is extended or adjusted under 35 U.S.C. 154(b) by 0 days.

(21) Appl. No.: 16/597,192

(22) Filed: Oct. 9, 2019

(65) Prior Publication Data
US 2020/0114738 A1    Apr. 16, 2020

(30) Foreign Application Priority Data
Oct. 11, 2018  (FR) .................................. 1859413

(51) Int. Cl.
*B60J 5/04* (2006.01)
*B60J 5/10* (2006.01)

(52) U.S. Cl.
CPC ........... *B60J 5/0455* (2013.01); *B60J 5/0481* (2013.01); *B60J 5/0484* (2013.01); *B60J 5/101* (2013.01)

(58) Field of Classification Search
CPC ........ B60J 5/0455; B60J 5/0437; B60J 5/043; B60J 5/042; B60J 5/107
See application file for complete search history.

(56) References Cited

U.S. PATENT DOCUMENTS 3,868,141 A * 2/1975 Johnson ................. B60J 5/0443
296/187.12
4,090,734 A * 5/1978 Inami ..................... B60J 5/0437
296/146.6
5,232,261 A * 8/1993 Kuroda ................... B60J 5/0444
296/146.4
5,544,930 A * 8/1996 Stedman ................. B60J 5/0437
296/146.6
6,082,811 A * 7/2000 Yoshida ................. B21C 23/205
296/146.6
6,196,619 B1 * 3/2001 Townsend ............. B60J 5/0444
296/146.6

(Continued)

FOREIGN PATENT DOCUMENTS

DE    102014222161 A1 *  5/2015 .............. B60J 5/107
DE    102015016417 A1 *  6/2017 ............ B60J 5/0437

(Continued)

OTHER PUBLICATIONS

FR1859413 search report dated Jul. 24, 2019.
FR1859413 written opinion dated Jul. 24, 2019.

*Primary Examiner* — Adriana Figueroa
(74) *Attorney, Agent, or Firm* — Anglehart et al.

(57) ABSTRACT

A vehicle bodywork panel is formed by an outer wall supported by a structural lining. The structural lining is produced by molding a plastic or composite material. The structural lining may include stiffeners arranged to provide said bodywork panel with a given amount of mechanical strength. One or more added connection elements connect separate fastening points disposed on the structural lining and each end of each of the connection elements is inserted into a housing disposed on a stiffener. The rigidity of the connection elements is adapted to suppress a vibration response of the stiffeners. The housing and the connection element may form a flush-mounted connection.

20 Claims, 4 Drawing Sheets

(56) References Cited

U.S. PATENT DOCUMENTS

| | | | | |
|---|---|---|---|---|
| 6,276,740 B1 * | 8/2001 | Mellor | ................... | B21D 39/04 |
| | | | | 280/90 |
| 6,382,707 B1 * | 5/2002 | Dunneback | ............ | B60J 5/0425 |
| | | | | 296/146.6 |
| 6,390,534 B1 * | 5/2002 | Lee | ........................ | B60J 5/0437 |
| | | | | 296/146.6 |
| 6,568,742 B2 * | 5/2003 | Seo | ........................ | B60J 5/0437 |
| | | | | 296/146.6 |
| 7,316,446 B2 * | 1/2008 | Wikstrom | ............. | B60J 5/0429 |
| | | | | 296/146.5 |
| 7,735,901 B2 * | 6/2010 | Melz | ..................... | B62D 25/04 |
| | | | | 296/146.6 |
| 8,276,977 B2 * | 10/2012 | Tanaka | ................... | B60J 5/0443 |
| | | | | 296/187.12 |
| 8,550,536 B2 * | 10/2013 | Gachter | ................... | B60J 5/101 |
| | | | | 296/146.8 |
| 8,727,421 B2 * | 5/2014 | Cohoon | ................. | B60J 5/0444 |
| | | | | 296/146.6 |
| 9,956,855 B2 * | 5/2018 | Tamaoki | ................ | B60J 5/0481 |
| 9,963,021 B2 * | 5/2018 | Miyake | ................ | B62D 29/001 |
| 10,052,941 B2 * | 8/2018 | Mildner | ................. | B60J 5/0429 |
| 10,059,178 B2 * | 8/2018 | Miyake | ................. | B60S 1/0441 |
| 10,112,463 B2 * | 10/2018 | Deng | .................... | B60J 5/0437 |
| 10,259,298 B2 * | 4/2019 | Choi | ..................... | B60J 5/0437 |
| 10,518,614 B2 * | 12/2019 | Ando | .................... | B60J 5/0458 |
| 10,589,603 B2 * | 3/2020 | Tanaka | ................... | B60J 5/0437 |
| 10,589,604 B2 * | 3/2020 | Schlachter | ......... | B60R 13/0815 |
| 2017/0174057 A1 | 6/2017 | Miyake et al. | | |
| 2017/0313165 A1 * | 11/2017 | Fortin | ................... | B60J 5/0416 |
| 2018/0222295 A1 | 8/2018 | Schlachter | | |
| 2018/0370342 A1 * | 12/2018 | Herten | ................... | B60J 5/0458 |
| 2019/0168588 A1 * | 6/2019 | Suzuki | ................... | B60J 5/0441 |
| 2020/0094658 A1 * | 3/2020 | Miyake | ................... | B60J 5/107 |

FOREIGN PATENT DOCUMENTS

| | | | | |
|---|---|---|---|---|
| FR | 2941175 A1 * | 7/2010 | ............ | B60J 5/0427 |
| GB | 2296475 A * | 7/1996 | ............ | B60J 5/0444 |
| JP | 3013921 B2 | 2/2000 | | |

* cited by examiner

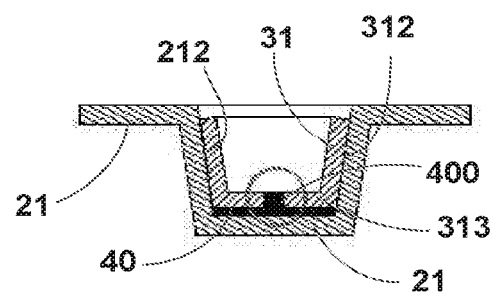
Fig 9
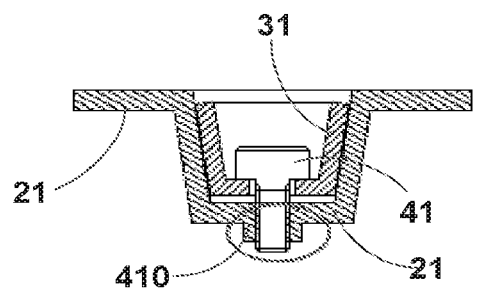
Fig 10
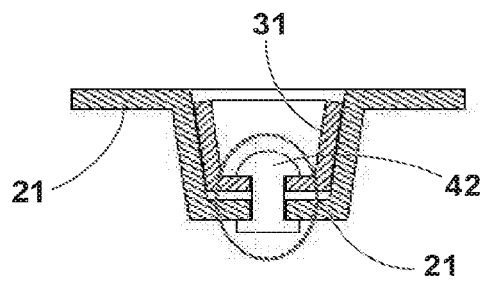
Fig 11
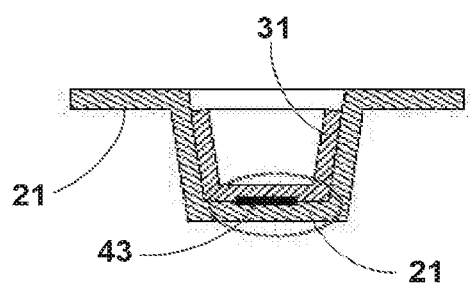
Fig 12
Fig 13A
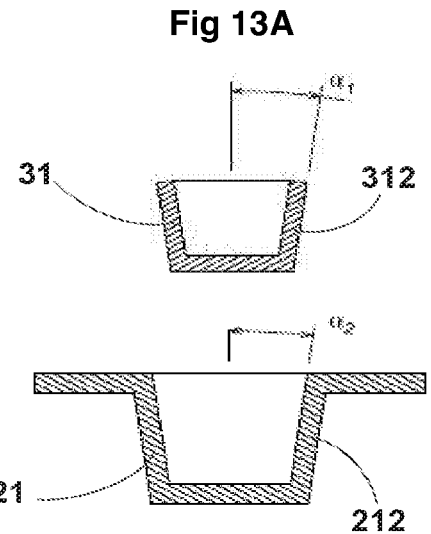
Fig 13B
Fig 13C
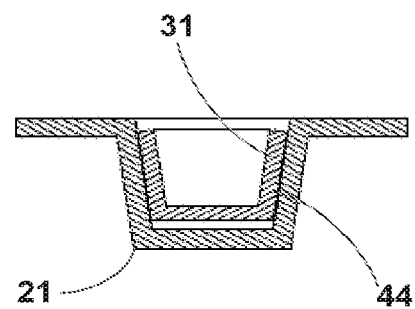

BODYWORK PANEL COMPRISING ADDED STIFFENING ELEMENTS

TECHNICAL FIELD

The invention relates to the field of motor vehicles and, more specifically, to the panels forming the bodywork elements.

More specifically, the doors of the vehicle are formed by a lining, forming the structural part, covered with a skin, forming the wall visible from outside the vehicle.

BACKGROUND

The lining comprises a set of stiffeners, which are interconnected to provide the lining, and therefore, more generally, the door, with rigidity and resistance to the expected mechanical stresses.

The present disclosure applies to bodywork panels formed by a lining covered with a skin, produced by molding a plastic or thermoplastic material or even a composite material, such as, for example, a tailgate or a vehicle side door. More generally, the outer skin can be produced separately from the lining and be subsequently assembled by adhesion or, in the simplest cases, even can be molded in one piece with the stiffeners forming the lining.

These particular panels are developed during the phase of designing a vehicle model according to precise specifications provided by the designer of the vehicle. These specifications provide the designer of the bodywork panel or of the door with information relating to the general shape of the vehicle, the connection points of the panel or of the door with the rest of the vehicle, the level of mechanical resistance to be met, as well as many other criteria such as the mass, the motorization types of the vehicle, the levels of equipment that can be accommodated, depending on the options, in the bodywork panel, as well as the excitation frequencies likely to require a specific vibration mode for the panel.

This design phase ends with the production and development of a mold designed to produce the linings that are intended to equip all versions of the vehicle model.

However, during the vehicle test phases of the first prototype parts, and in particular during the tests during which the various proposed options are combined, it has been found that unexpected and particularly troublesome vibrations occur on the panel at certain excitation frequencies and in respect of the installation of specific equipment combinations, in particular for linings produced by molding a thermoplastic, plastic or composite material. Thus, by way of an example, for a tailgate type door, for such a version of a model equipped with a specific option, such as a heavier powered actuator opening system, the tailgate vibrates when the vehicle travels on a particular road surface or when the engine runs at a certain speed. These unplanned events can also occur during the lifetime of the vehicle when equipment options that are not originally planned are proposed to boost the allure of the vehicle.

These situations are identified at a late stage in the development of the structural lining or of the door, and most often at a stage in which it is not industrially or economically possible to design a new lining and a new specific mold for this particular version of the vehicle model.

Document US2018/0222295 discloses a bodywork panel comprising connection elements between the stiffeners forming the structural lining. These connection elements comprise, at a first end, a fork that is introduced into an orifice disposed on a stiffener until it comes into abutment on a shoulder, and a second end, clipped on a post of another stiffener. This device nevertheless allows longitudinal displacement of the connection element and does not allow effective filtering of the longitudinal vibrations.

SUMMARY

The subject matter of the present disclosure proposes an economical and practical solution to be implemented to solve this problem.

The vehicle bodywork panel according to the present disclosure is formed by an outer wall supported by a structural lining, produced by molding a plastic or composite material, comprising stiffeners arranged to provide said bodywork panel with a given amount of mechanical strength.

This panel is characterized in that one or more connection element(s), the rigidity of which is adapted to remove a vibration response of the stiffeners, connect, on each end thereof, separate fastening points disposed on the lining, and wherein each end of the connection element is inserted into a housing, disposed on a stiffener, in order to form a flush-mounted connection with said stiffener.

A connection element is intended to connect appropriately selected fastening points, by forming bridges between these points, so as to create additional and optional stiffening means that can be added and inserted on demand on the models from the same vehicle range exhibiting the aforementioned vibration anomalies.

The lining thus provides, as soon as it is designed, specific housings forming fastening points intended to receive, if necessary, one or more connection element(s) adapted and intended to receive each of the ends of the connection elements.

The connection element connects the two stiffeners by forming flush-mounted connections. The connection between the stiffener and the connection element is thus devoid of any degree of freedom, so that the vibration modes in a longitudinal direction of the connection element are effectively filtered.

The connection element is rigid, and its rigidity is adapted to filter and to suppress the vibration responses of the stiffeners.

The bodywork panel according to the present disclosure can comprise, in isolation or in combination, the following features:
- the side walls of the housing are in permanent contact with the side walls of the end of the connection element and comprise protrusions intended to cooperate with a constriction disposed at the end of the connection element and are arranged in such a way as to prevent the connection element from exiting the housing in a longitudinal direction of the connection element so that the shape of the housing matches the shape of the end of the connection element;
- At least one connection element connects at least two separate stiffeners of the lining (2).
- At least one connection element is connected, by one of the ends thereof, to a fastening point disposed on equipment fixed on the lining.
- One end of the connection element is retained in the housing by force fitting or by a fixing means such as an adhesive film, a screw or a weld.
- The connection elements have a general linear shape.

The ends of the connection elements and the housings comprise polarization means, associated in pairs, to prevent insertion errors.

The stiffeners are formed by a base plate and at least one side panel.

The housings are disposed on the base plates or on the walls of the side panels of the stiffeners.

At least one connection element is disposed on the part of the lining located on the inside of the vehicle.

At least one connection element is disposed on the part of the lining located on the outside of the vehicle.

The connection element is produced by molding a composite or thermoplastic material.

The connection element comprises a metal part inserted into a thermoplastic matrix.

The present disclosure also relates to a bodywork panel having one or more of the features set forth above and forming a vehicle door and, more specifically, a tailgate or a side door.

BRIEF DESCRIPTION OF THE FIGURES

The present disclosure will be better understood upon reading the appended figures, which are provided by way of examples and are by no means limiting and in 10 which:

FIGS. 9 to 13A-C illustrate variants for fixing a connection element in a housing.

DETAILED DESCRIPTION

Figure 1:
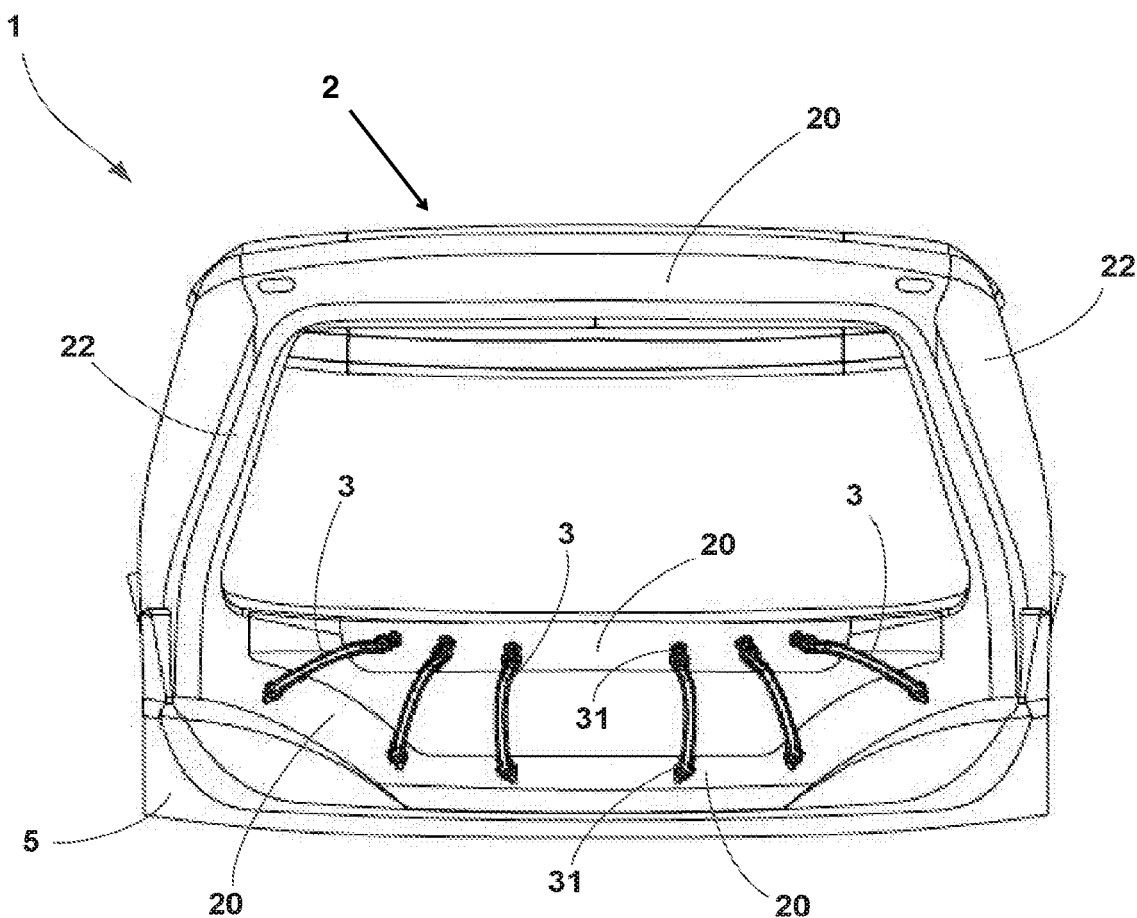
FIG. 1 is a view of a tailgate viewed from inside the vehicle comprising connection elements according to the present disclosure.

FIG. 1 shows a structural lining 2 of a vehicle tailgate 1 comprising stiffeners 20, the overall rigidity of which provides the tailgate with the mechanical strength required by the vehicle design specifications. These stiffeners 20 follow, for example, the edges of the tailgate and then form a structural frame of the outer edge of the tailgate supporting the skin 5 visible from outside the vehicle, or form a structural frame surrounding the opening of the rear window.

Stiffeners 22 form the side posts of the tailgate, on which, or inside which, the opening actuators, the side edges of the rear window, electrical cables, or even light or electronic devices forming part of the ancillary equipment of the tailgate, are disposed.

The lining, and in particular the stiffeners located on the outer edge, acts as a support for fixing the hinges or the lock.

The lining of the tailgate, and more generally the lining of the bodywork panel, may be formed by molding a thermoplastic material such as, by way of an example, talc-filled polypropylene.

Connection elements 3 connect, at the two ends 31 thereof, two separate stiffeners of the structural lining 2.

The connection elements 3 define, with the fastening points disposed on the lining, flush-mounted type connections, without any degrees of translational or rotational freedom, so as to provide the additional rigidity required to suppress a vibration modal response of the stiffeners at a natural excitation frequency. The connection elements thus allow the relative displacement of two stiffeners to be blocked.

Figure 2:
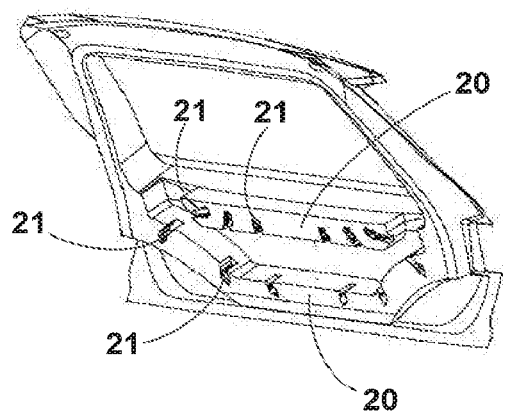
FIG. 2 is a perspective view of the lining comprising fastening points forming housings intended to receive connection elements.

FIG. 2 illustrates the tailgate as it appears at the end of the operation of the molding step, without connection elements 3.

Figure 3:
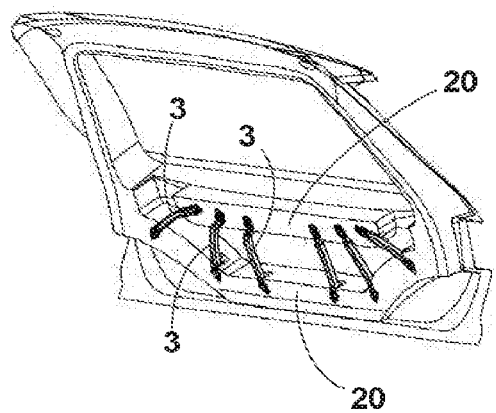
FIG. 3 is a perspective view of the lining in which connection elements are inserted into the housings.

Housings 21, acting as a fastening point, are provisionally provided at various predetermined points of the stiffeners 20. These housings 21 have a shape that is adapted to receive the ends 31 of the connection elements 3, as illustrated in FIG. 3.

Figure 4:
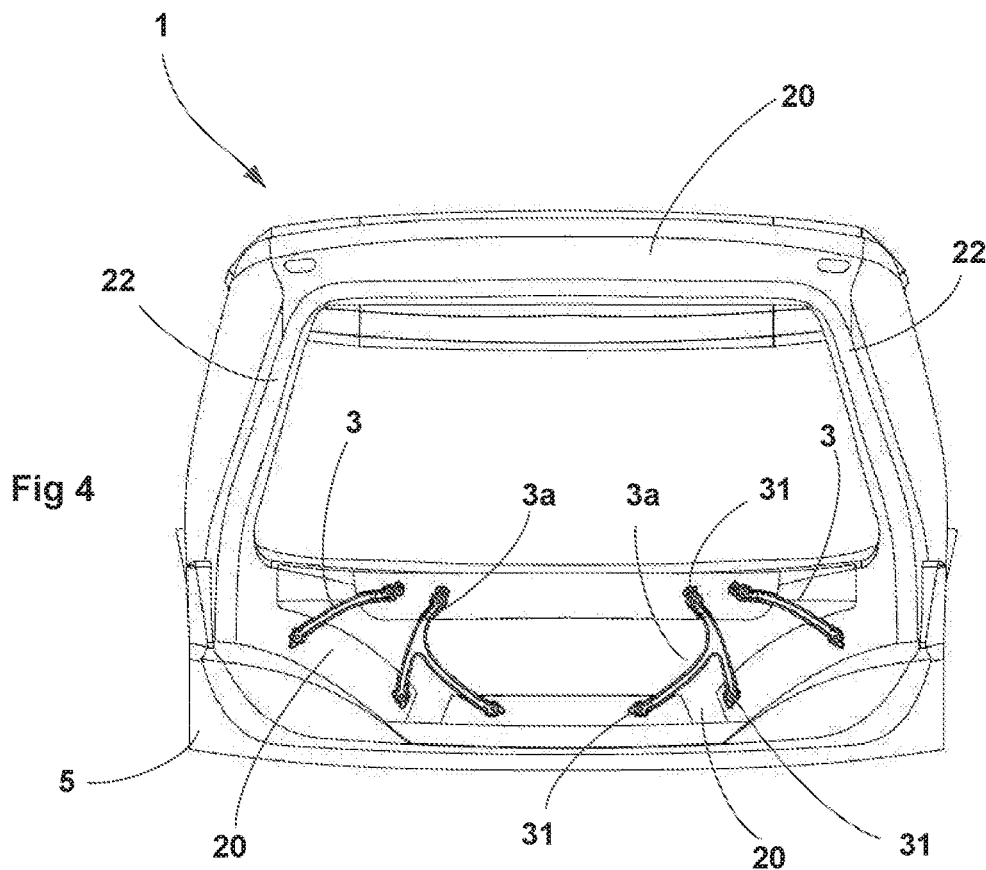
FIG. 4 shows a view of a tailgate comprising connection elements formed by a plurality of branches.

In this case it can be seen that the connection elements shown in FIG. 1 comprise only two ends. However, the present disclosure does not exclude the case whereby the connection element 3a comprises a plurality of branches and therefore more than two ends, as illustrated in FIG. 4.

Figure 5:
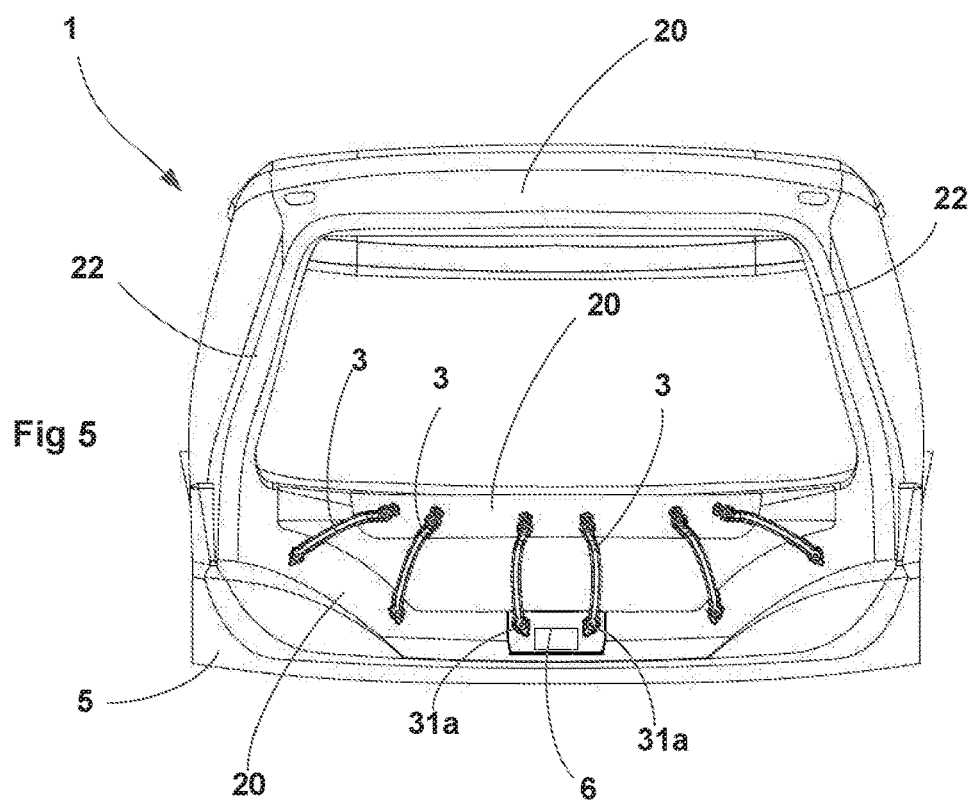
FIG. 5 shows a view of a tailgate in which the connection elements are fastened to equipment mounted on the lining.

As an alternative embodiment of the present disclosure, it is also possible to fix one of the ends of a connection element on equipment which is itself mounted on the skin of the bodywork part or on equipment securely mounted on the lining such as, by way of an example, the wiper motor, or the lock 6 of a door, as illustrated in FIG. 5. In this case, it is then necessary to provide suitable fastening points 31a on the equipment in question.

Figures 6A, 6B, 6C:
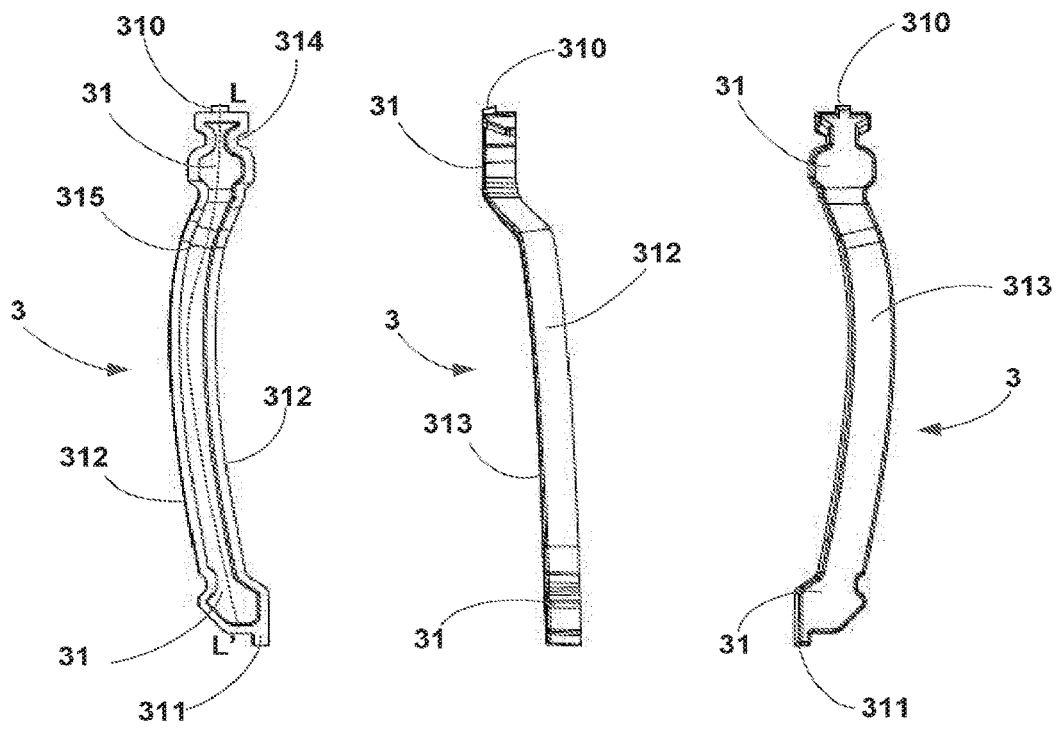
FIGS. 6A-C show views along three separate faces of a particular connection element.
Figure 7:
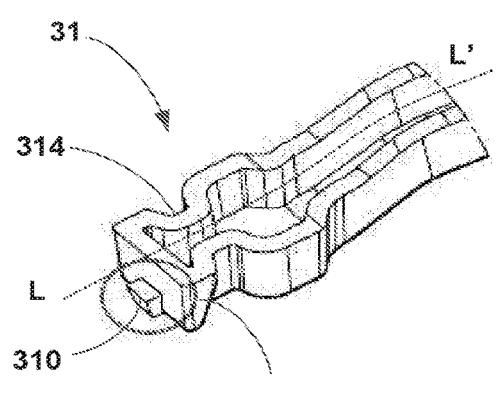
FIG. 7 is a detailed perspective view of an end of a connection element.

FIGS. 6A-C illustrate a connection element 3 viewed from the front face, the side face and the rear face thereof, respectively.

The connection element 3 has a general elongated shape. In this case, a general elongated shape is understood to mean a connection element with a square root of the surface of any straight section 315 that is much lower than the length of the neutral fiber represented herein by the dotted line LL'. The shape of the connection element 3, and of the line LL' (in dotted lines in FIGS. 6A-C), is designed to connect two stiffeners together, while preserving the space required for housing the aforementioned ancillary equipment.

The connection element 3 illustrated in FIGS. 6A-C and 7 and acting as a support for the present description is in the form of a substantially rigid beam comprising a base plate 313 bordered by two side walls 312. The connection element 3 comprises two ends 31, the shape of which is adapted to be inserted, by flush-mounting, into a housing 21 disposed on a stiffener 20. The rigidity of the connection element can be adapted according to the desired result.

In order to safeguard against insertion errors, the ends 31 of the connection element can adopt a particular shape adapted to the shape of the housing in which it is intended to be inserted, like two puzzle pieces, or can even comprise locators 310, 311 that are appropriately disposed in order to be placed in a specific cut produced in the housing 21.

The side walls 312 of one end 31 also form a constriction 314 intended to cooperate with protrusions 210 (see FIG. 8) disposed in the housing 21 and arranged to prevent the connection element 3 from exiting the housing in the longitudinal direction LL' of the connection element.

Figure 8:
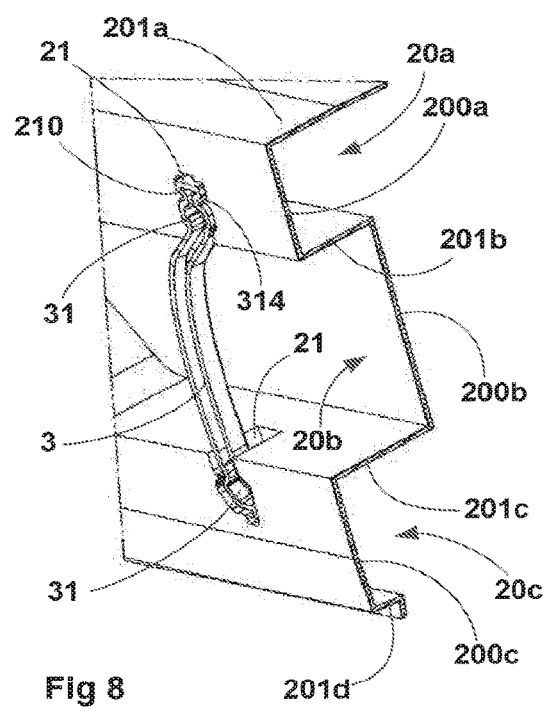
FIG. 8 is a perspective view illustrating a particular mounting of a connection element between two stiffeners of the lining.

FIG. 8 shows the details of, by way of an example, the mounting of the connection element between two stiffeners 20a and 20c. Each of the stiffeners comprises a base plate, respectively 200a and 200c, connected, by the two side edges thereof, to walls, respectively 201a, 201b and 201c, 201d, acting as side panels. The concave portion of the stiffeners 20a and 20c in this case is oriented on the outside of the vehicle. This particular embodiment of the stiffeners does not exclude the simpler case in which the stiffeners comprise only one panel.

The connection elements 3 connect the base plates of the two stiffeners 20a and 20c.

It will be seen that the partitions 201b and 201c are themselves interconnected by a base plate 200b and together form a stiffener 20b, the concavity of which is oriented on the inside of the vehicle. The stiffener 20b can also comprise one or more housings to be connected, if necessary, by one or more connection elements with an adjacent stiffener (not shown).

Alternatively, the housings also can be disposed on the walls of the side panels.

It follows from these observations that the connection elements equally can be disposed, as required, on the inside of the vehicle or on the outside of the vehicle.

The connection element 3 may be produced by molding a thermoplastic material, or any other material likely to provide said element with the strength and the rigidity required to reduce the vibrations of the lining. To this end, and when it seems necessary, it is also possible to produce a hybrid connection element comprising a metal part inserted into a thermoplastic matrix.

FIGS. 9 to 13A-C illustrate modes of fixing, by flush-mounting, an end 31 in a housing 21. Indeed, it is important that the connection element 3, once inserted, by the two ends thereof, into the housings arranged in two separate stiffeners, does not disconnect inappropriately.

Furthermore, arrangements will be made so that, at the ends 31, the shapes of the side walls 312 of the connection element 3 are in permanent contact with the side walls 212 of the housing 21, so that the shape of the housing matches the shape of the end of the connection element.

FIG. 9 illustrates the case in which the end 31 is fixed in a housing 21 by an adhesive film 40. To ensure a constant thickness of adhesive it is advantageous for outlets 400 to be made in the base plate 313 of the connection element 3.

FIG. 10 illustrates the case in which the end 31 is fixed in the housing 21 by a screw 41 inserted into a raised portion 410 disposed on the bottom of the housing 21. A self-tapping plastic screw usefully can be employed.

The rivet 42 fixing mode is shown in FIG. 11.

FIG. 12 illustrates the case in which the end 31 is secured to the housing by a weld 43, for example by ultrasonic welding.

Finally, FIGS. 13A-C illustrates the case in which the end 31 is force-fitted 44 in the housing 21. To this end, the side walls 312 have an incline$_{\beta1}$ that is slightly greater than the incline$_{\beta2}$ of the side walls 212 of the housing 21. The resistance of this type of interlocking usefully can be improved by making the side walls 312 of the end 31 and the side walls 212 of the housing 31 slightly rough.

Other fixing modes, such as fixing by stapling or by clipping also can be contemplated.

All these fixing modes, which optionally can be combined in pairs, allow the connection elements 3 to be introduced, and if necessary extracted, on demand in order to adjust the modal vibration response of the lining.

Of course, all the provisions mentioned in the above description apply mutatis mutandis to a side door.

NOMENCLATURE

1 Bodywork/tailgate panel.
2 Structural lining.
20, 20a, 20b, 20c Stiffeners.
22 Post.
200, 200a, 200b, 200c Base plate.
201, 201a, 201b, 201c, 201d Side panel.
21 Fastening point, Housing.
210 Protrusion.
212 Side walls of the housing.
3 Connection element.
3a Connection element.
31 End of a connection element.
310, 311 Locators.
312 Side walls of the connection element.
313 Base plate of the connection element.
314 Constriction.
315 Straight section.
40 Adhesive.
400 Outlet.
41 Screw.
410 Raised portion.
42 Rivet.
43 Weld.
44 Force-fitting.
5 Outer skin.
6 Tailgate lock.

The invention claimed is:

1. A vehicle bodywork panel, formed by an outer wall supported by a structural lining, produced by molding a plastic or composite material, comprising stiffeners arranged to provide said bodywork panel with a given amount of mechanical strength, wherein one or more added rigid connection elements, the rigidity of which is adapted to suppress a vibration response of the stiffeners, connect, at each of their ends, at separate fastening points disposed on the lining, and wherein each end of the one or more connection elements is inserted into a housing recessed in a stiffener of said stiffeners, and forming, with said stiffener, a flush-mounted connection.

2. The vehicle bodywork panel according to claim 1, wherein the side walls of the housing are in permanent contact with the side walls a respective one of the ends of the one or more connection elements and comprise protrusions intended to cooperate with one or more constrictions disposed at the respective one of the ends of the one or more connection element and are arranged so as to prevent the respective one of the ends of the one or more connection elements from exiting the housing in a longitudinal direction of the one or more connection elements, so that the shape of the housing matches the shape of the respective one of the ends of the connection elements.

3. The vehicle bodywork panel according to claim 1, wherein at least one connection element of the one or more connection elements connects at least two separate ones of the stiffeners of the lining.

4. The vehicle bodywork panel according to claim 1, wherein at least one connection element of the one or more connection elements is connected, by one of the ends thereof, to a fastening point disposed on equipment fixed on the lining.

5. The vehicle bodywork panel according to claim 1, wherein one of the ends of the one or more connection elements is retained in the housing by force-fitting or by an adhesive film, a screw, or a weld.

6. The vehicle bodywork panel according to claim 1, wherein the one or more connection elements have a linear shape.

7. The vehicle bodywork panel according to claim 1, wherein the ends of the one or more connection elements and the housings comprise polarization means, associated in pairs, to prevent insertion errors.

8. The vehicle bodywork panel according to claim 1, wherein the stiffeners are formed by a base plate and at least one side panel.

9. The vehicle bodywork panel according to claim 8, wherein the housings are disposed on the base plates or on the walls of the side panels of the stiffeners.

10. The vehicle bodywork panel according to claim 1, wherein at least one connection element of the one or more connection elements is disposed on the part of the lining located on the inside of the vehicle.

11. The vehicle bodywork panel according to claim 1, wherein at least one connection element of the one or more connection elements is disposed on the part of the lining located on the outside of the vehicle.

12. The vehicle bodywork panel according to claim 1, wherein the one or more connection elements are produced by molding a composite or thermoplastic material.

13. The vehicle bodywork panel according to claim 1, wherein the one or more connection elements comprise a metal part inserted into a thermoplastic matrix.

14. The vehicle bodywork panel according to claim 1 forming a vehicle door.

15. The vehicle bodywork panel according to claim 14, forming a tailgate or a side door.

16. A tailgate comprising:
an outer wall; and
a structural lining supporting the outer wall, the structural lining comprising:
one or more stiffeners arranged to provide the bodywork panel with a given amount of strength; and
one or more connection elements, each connection element having two ends, wherein each end of each of the one or more connection elements is inserted into a housing recessed in one of the one or more stiffeners to connect separate fastening points disposed on the structural lining, and wherein a rigidity of the one or more connection elements is adapted to suppress vibration responses of the one or more stiffeners.

17. The tailgate of claim 16, wherein the structural lining is made of a plastic or composite material.

18. The tailgate of claim 16, wherein at least one connection element of the one or more connection elements and at least one of the one or more stiffeners form a flush-mounted connection.

19. The vehicle bodywork panel according to claim 1, wherein walls of the housing are arranged to prevent the end of a respective one of the one or more connection elements from exiting the housing in a longitudinal direction of the one or more connection elements.

20. The tailgate of claim 16, wherein walls of the housing are arranged to prevent the end of a respective one of the one or more connection elements from exiting the housing in a longitudinal direction of the one or more connection elements.

* * * * *